United States Patent
Hein et al.

(10) Patent No.: US 11,760,878 B2
(45) Date of Patent: Sep. 19, 2023

(54) TRANSPARENT AND FLEXIBLE BLENDS OF PMMA AND POLYCARBONATE-SILOXANE COPOLYMER

(71) Applicant: SHPP GLOBAL TECHNOLOGIES B.V., Bergen op Zoom (NL)

(72) Inventors: Christopher Luke Hein, Mt. Vernon, IN (US); Hao Zhou, Mt. Vernon, IN (US); Bing Zhou, Mt. Vernon, IN (US); Manojkumar Chellamuthu, Mt. Vernon, IN (US); Peter Vollenberg, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 296 days.

(21) Appl. No.: 17/286,873

(22) PCT Filed: Oct. 22, 2019

(86) PCT No.: PCT/IB2019/059016
§ 371 (c)(1),
(2) Date: Apr. 20, 2021

(87) PCT Pub. No.: WO2020/084490
PCT Pub. Date: Apr. 30, 2020

(65) Prior Publication Data
US 2021/0380809 A1    Dec. 9, 2021

(30) Foreign Application Priority Data
Oct. 22, 2018  (EP) .................................... 18201736

(51) Int. Cl.
| | | |
|---|---|---|
| *C08L 83/10* | (2006.01) | |
| *C08J 5/18* | (2006.01) | |
| *C08L 33/12* | (2006.01) | |

(52) U.S. Cl.
CPC ................ *C08L 83/10* (2013.01); *C08J 5/18* (2013.01); *C08L 33/12* (2013.01); *C08J 2333/12* (2013.01); *C08J 2383/10* (2013.01); *C08J 2433/12* (2013.01); *C08J 2483/10* (2013.01); *C08L 2201/08* (2013.01); *C08L 2203/16* (2013.01); *C08L 2203/30* (2013.01)

(58) Field of Classification Search
CPC .................................................. C08J 2383/10
See application file for complete search history.

(56) References Cited

U.S. PATENT DOCUMENTS

| | | |
|---|---|---|
| 4,478,981 A | 10/1984 | Arkles |
| 4,743,654 A | 5/1988 | Kyu et al. |
| 4,745,029 A | 5/1988 | Kambour |
| 5,280,070 A | 1/1994 | Drzewinski |
| 6,723,864 B2 | 4/2004 | Silva et al. |
| 8,030,400 B2 * | 10/2011 | Kung ...................... C08L 55/02 525/66 |
| 8,466,249 B2 | 6/2013 | Gallucci et al. |
| 10,655,001 B2 * | 5/2020 | Hein ....................... C08L 83/10 |
| 11,193,014 B2 * | 12/2021 | Hein ................... B29C 45/0001 |
| 2004/0039145 A1 | 2/2004 | Silva et al. |
| 2018/0002932 A1 * | 1/2018 | Van Giel ............... B32B 27/304 |
| 2018/0030259 A1 | 2/2018 | Somasundaram et al. |
| 2018/0112035 A1 | 4/2018 | Rizo et al. |
| 2020/0317846 A1 * | 10/2020 | Ideta .................... C08G 64/186 |

FOREIGN PATENT DOCUMENTS

| | | |
|---|---|---|
| CN | 1754912 A | 4/2006 |
| CN | 101855292 A | 10/2010 |
| CN | 102558812 A | 7/2012 |
| CN | 104428343 A | 3/2015 |
| CN | 111073191 A | 4/2020 |
| CN | 111849106 A | 10/2020 |
| CN | 113785014 A | 12/2021 |
| EP | 1627897 A1 | 2/2006 |
| EP | 2455426 A1 | 5/2012 |
| WO | 2008042500 A1 | 4/2008 |
| WO | 2010076680 A1 | 7/2010 |
| WO | 2013190474 A1 | 12/2013 |
| WO | 2016174592 A1 | 11/2016 |
| WO | 2017149457 A1 | 9/2017 |

OTHER PUBLICATIONS

Dixit M., et al., "Morphology, Miscibility and Mechanical Properties of PMMA/PC blends," In Phase Transitions, 2009, vol. 82, Issue 12, pp. 866-878. [https://doi.org/10.1080/01411590903478304]. (Abstract Only).
Extended European Search Report issued in European Application No. 18201736.8, dated Mar. 29, 2019, 7 pages.
International Search report and Written Opinion issued in International Application No. PCT/IB2019/059016, dated Jan. 22, 2020, 9 pages.
Kyu T., et al., Journal of Polymer Science Part C: Polymer Letters, 1989, vol. 27, pp. 421-426. (Abstract Only).
Singh A.K. et al., Chemical Physics Letters, 2010, vol. 486, pp. 32-36. (Abstract Only).

* cited by examiner

*Primary Examiner* — Jeffrey C Mullis
(74) *Attorney, Agent, or Firm* — Quicker Law, LLC

(57) ABSTRACT

A thermoplastic composition includes from about 30 wt % to about 95 wt % poly(methyl methacrylate) (PMMA), and from about 5 wt % to about 70 wt % of a poly(carbonate-siloxane) copolymer having a siloxane content of from about 25 wt % to about 45 wt %. A method of making a thermoplastic composition includes: (a) combining from about 30 wt % to about 95 wt % poly(methyl methacrylate) (PMMA) and from about 5 wt % to about 70 wt % of a poly(carbonate-siloxane) copolymer having a siloxane content of from about 25 wt % to about 45 wt % to form a mixture; and melt processing the mixture to polymerize it and form the thermoplastic composition.

12 Claims, 7 Drawing Sheets

TRANSPARENT AND FLEXIBLE BLENDS OF PMMA AND POLYCARBONATE-SILOXANE COPOLYMER

FIELD OF THE DISCLOSURE

The present disclosure relates to thermoplastic compositions including poly(methyl methacrylate) and polycarbonate-siloxane copolymers.

BACKGROUND OF THE DISCLOSURE

Blends of poly(methyl methacrylate) (PMMA) and polycarbonate (PC) are the focus of many investigations. Attempts have been made to develop a melt processable, transparent PMMA-PC blend having an increased glass transition temperature (Tg), but have been largely unsuccessful. Such blends generally have high haze, or are opaque and immiscible. PMMA is an amorphous polymer having excellent optical properties, chemical resistance, and high tensile strength, but it is also brittle, has low elongation at break and has high water absorption. Blends of PMMA with PC would be expected to have improved flexibility which could be useful in electronic display applications, but suitable transparent blends including these polymers have not been developed.

These and other shortcomings are addressed by aspects of the disclosure.

SUMMARY

Aspects of the disclosure relate to thermoplastic compositions including: from about 30 wt % to about 95 wt % poly(methyl methacrylate) (PMMA); and from about 5 wt % to about 70 wt % of a poly(carbonate-siloxane) copolymer having a siloxane content of from about 25 wt % to about 45 wt %.

Further aspects of the disclosure relate to methods of making a thermoplastic composition, including: (a) combining from about 30 wt % to about 95 wt % poly(methyl methacrylate) (PMMA) and from about 5 wt % to about 70 wt % of a poly(carbonate-siloxane) copolymer having a siloxane content of from about 25 wt % to about 45 wt % to form a mixture; and (b) melt processing the mixture to polymerize it and form the thermoplastic composition.

Yet further aspects of the disclosure relate to methods of forming a thermoplastic composition, including: (a) forming a poly(carbonate-siloxane) copolymer in a tube reactor process, the tube reactor process including forming siloxane-chloroformate prior to copolymerizing the poly(carbonate-siloxane) copolymer, wherein the poly(carbonate-siloxane) copolymer has a siloxane content of from about 25 wt % to about 45 wt %; and (b) combining from about 5 wt % to about 70 wt % of the poly(carbonate-siloxane) copolymer with from about 30 wt % to about 95 wt % poly(methyl methacrylate) (PMMA) to form the thermoplastic composition.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

DETAILED DESCRIPTION

Figure 1:
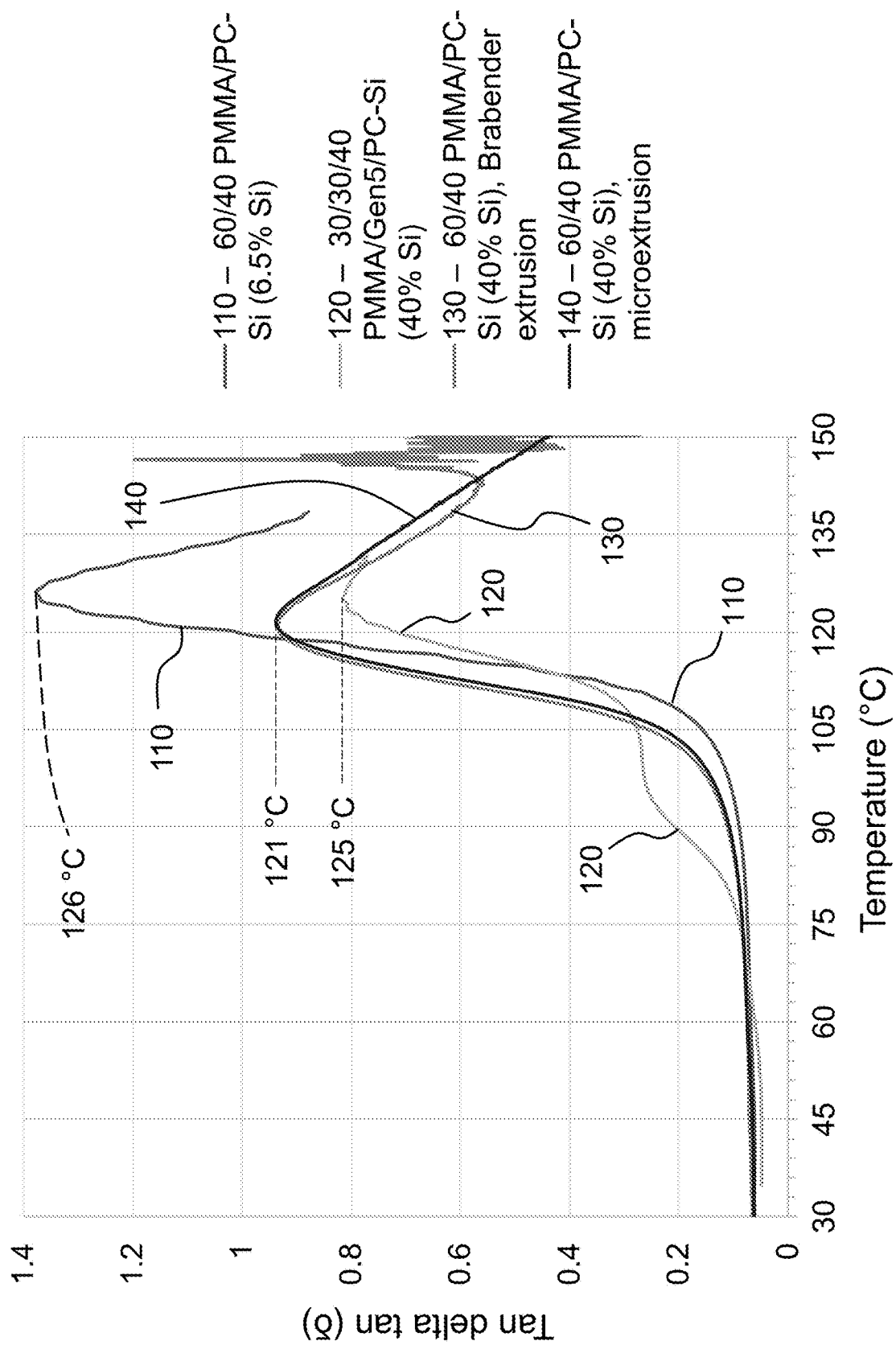
FIG. 1 is a graph showing the glass transition temperature (Tg) of various PMMA/PC-Si copolymer blends.

The present disclosure relates to transparent blends of PMMA and PC-siloxane copolymers that include a relatively high siloxane content (about 25-45 wt % siloxane in the copolymer). Thermoplastic compositions including the PC-Si copolymer may be blended with PMMA to produce transparent blends across a wide range of polymer ratios. The blends have a glass transition temperature (Tg) greater than PMMA and can be melt processed at lower temperatures (240 degrees Celsius (° C.) or lower) than many conventional polycarbonate grades. In one aspect, the PMMA/PC-Si blend has a single Tg which demonstrates uniformly distributed phases. In addition to transparency, blends according to aspects of the disclosure are flexible, in contrast to conventional general purpose PMMA, which is brittle, and when blended with conventional PC is opaque or possesses high haze. Specific aspects of the disclosure relate to a thermoplastic composition including: from about 30 wt % to about 95 wt % poly(methyl methacrylate) (PMMA); and from about 5 wt % to about 70 wt % of a poly(carbonate-siloxane) copolymer having a siloxane content of from about 25 wt % to about 45 wt %.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein "Si content" or "X % Si" refers to the siloxane content of the component (e.g., the PC-Si copolymer) or composition.

As used in the specification and the appended claims, the singular forms "a," "an" and "the" include plural referents unless the context clearly dictates otherwise. Thus, for example, reference to "a poly(methyl methacrylate)" includes compositions including two or more poly(methyl methacrylates).

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions Including PMMA and PC-Si Copolymer

Aspects of the disclosure relate to thermoplastic compositions including from about 30 wt % to about 95 wt % PMMA, and from about 5 wt % to about 70 wt % of a poly(carbonate-siloxane) copolymer having a siloxane content of from about 25 wt % to about 45 wt %. In certain aspects the poly(carbonate-siloxane) copolymer has a siloxane content of from about 35 wt % to about 45 wt %, and in a specific aspect the poly(carbonate-siloxane) copolymer has a siloxane content of about 40 wt %.

In particular aspects the thermoplastic composition includes from about 55 wt % to about 85 wt % PMMA and from about 15 wt % to about 45 wt % of the poly(carbonate-siloxane) copolymer. In a specific aspect the thermoplastic composition includes about 55 wt % to about 65 wt % PMMA and about 35 wt % to about 45 wt % of the poly(carbonate-siloxane) copolymer. In another specific aspect the thermoplastic composition includes about 75 wt % to about 85 wt % PMMA and about 15 wt % to about 25 wt % of the poly(carbonate-siloxane) copolymer.

Any suitable PMMA polymer may be used in the composition. Exemplary PMMA polymers include, but are not limited to, Acrylite® POQ66 available from Evonik, Plexiglas® V920A available from Arkema, and combinations thereof.

The poly(carbonate-siloxane) copolymers include carbonate units and siloxane units. Suitable carbonate units are shown in formula (1)

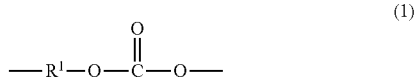
(1)

wherein at least 60 percent of the total number of $R^1$ groups is aromatic, or each $R^1$ contains at least one $C_{6-30}$ aromatic group. A combination of different $R^1$ groups can be present. The carbonate units can be derived from a dihydroxy compound such as an aromatic dihydroxy compound of formula (2) or a bisphenol of formula (3)

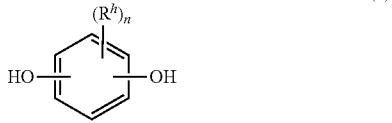
(2)

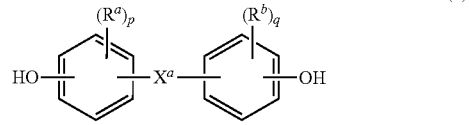
(3)

wherein in formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other aspects in formula (2), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)— wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination including different diphenol compounds can be used.

Examples of bisphenols (3) include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7- dihydroxy-9,10-dimethylphenazine, 3,6-dihydroxydibenzofuran, 2,7-dihydroxycarbazole, or the like. A combination including different bisphenol compounds can be used.

Specific dihydroxy compounds include resorcinol, 2,2-bis(4-hydroxyphenyl) propane (bisphenol A or BPA), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In an aspect of formula (2), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In more preferred aspect, the bisphenol polycarbonate is a bisphenol A polycarbonate homopolymer, also referred to as bisphenol A homopolycarbonate, which has repeating structural carbonate units of formula (1a).

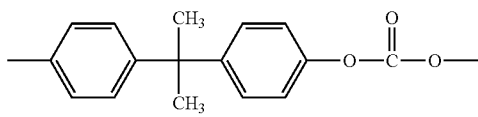

(1a)

Such linear homopolymers containing bisphenol A carbonate units (BPA-PC) include those commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC.

The siloxane units (also referred to as polysiloxane blocks) are optionally of formula (4)

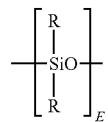

(4)

wherein each R is independently a $C_{1-13}$ monovalent organic group. For example, R can be a $C_{1-13}$ alkyl, C-$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) is desired, R is unsubstituted by halogen. A combination of the foregoing R groups can be used in the same poly(carbonate-siloxane).

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, each R is independently methyl, trifluoromethyl, or phenyl.

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (5)

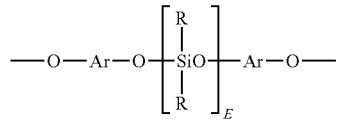

(5)

wherein E is as defined for formula (4); each R can be the same or different, and is as defined for formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (6a) and (6b)

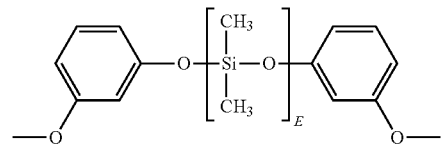

(6a)

-continued (6b)

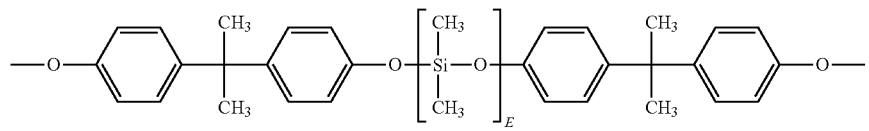

wherein E is as described in Formula (4). In an aspect, E has an average value of 10 to 80 or 10 to 40, and in still another aspect, E has an average value of 40 to 80, or 40 to 70.

In another aspect, the siloxane units are of formula (7)

(7)

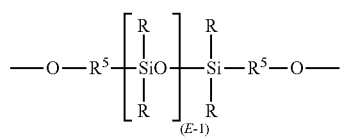

wherein R and E are as described for formula (4), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (8):

(8)

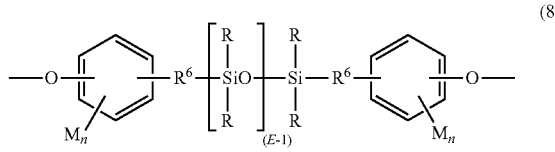

wherein R and E are as defined for formula (5). $R^6$ in formula (8) is a divalent $C_{2-8}$ aliphatic group. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an aspect in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (8), R is methyl, or a combination of methyl and trifluoropropyl, or a combination of methyl and phenyl. In still another aspect in formula (8), R is methyl, M is methoxy, n is one, and $R^6$ is a divalent $C_{1-3}$ aliphatic group. Preferred polydiorganosiloxane blocks are of the formulas (8a)

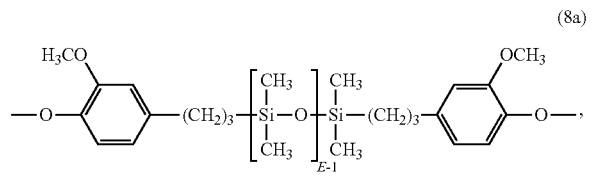

-continued (8b)

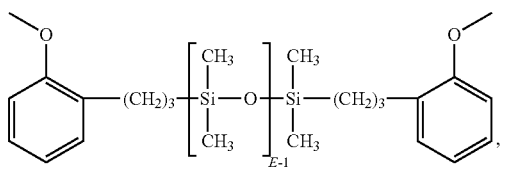

(8c)

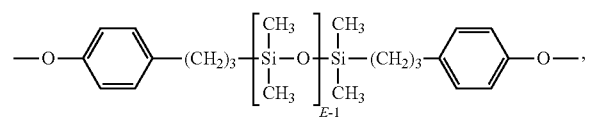

or a combination thereof, wherein E has an average value of 10 to 100, preferably 20 to 60, more preferably 30 to 50, or 40 to 50.

In an aspect, the poly(carbonate-siloxane) includes carbonate units derived from bisphenol A, and repeating siloxane units (8a), (8b), (8c), or a combination thereof (preferably of formula 7a), wherein E has an average value of E has an average value of 10 to 100, or 20 to 60, or 30 to 60, or 40 to 60. In an aspect, the poly(carbonate-siloxane)s include carbonate units derived from bisphenol A and repeating siloxane units of formula (8a) (8b), or (8c), wherein E has an average value of 10 to 100, or 20 to 60, or 30 to 50, or 40 to 50.

The poly(carbonate-siloxane) can have a siloxane content of 25 to 45 wt %, or about 40 wt %, based on the total weight of the poly(carbonate-siloxane). As used herein, "siloxane content" of the poly(carbonate-siloxane) means the content of siloxane units based on the total weight of the poly (siloxane-carbonate). The poly(carbonate-siloxane) can have a weight average molecular weight of 26,000 to 45,000 Da, or 30,000 to 43,000 Da, or 35,000 to 40,000 Da as measured by gel permeation chromatography using a cross-linked styrene-divinyl benzene column, at a sample concentration of 1 milligram per milliliter, and as calibrated with bisphenol A polycarbonate standards. In other aspects, the poly(carbonate-siloxane) can have a weight average molecular weight of 10,000 to 100,000 Da, or 50,000 to 100,000 Da.

In some aspects the thermoplastic composition including the PMMA and the poly(carbonate-siloxane) copolymer is transparent. As used herein, "transparent" means that the composition has a total light transmission (specular+diffuse) of at least 60% when measured on a sample of the composition having a thickness of from 1.0 to 3.2 millimeters (mm). In further aspects the composition including the PMMA and the poly(carbonate-siloxane) copolymer is translucent. As used herein, "translucent" means that the composition has a total light transmission (specular+diffuse) of greater than 30% but less than 60% when measured on a sample of the composition having a thickness of from 1.0 to 3.2 mm. It is noted that light transmission is not significantly affected by part thickness in this thickness range.

The thermoplastic composition may be flexible in some aspects. As used herein, "flexible" means that the composition has a tensile elongation at break of 20% or higher.

In certain aspects the composition further includes one or more additional polymers. Suitable additional polymers include, but are not limited to, low density polyethylene, poly(ethylene-propylene), styrene-butadiene rubber, polybutadiene, poly(butyl acrylate), silicone rubber, polyamide, polyaramide, polycarbonate, polyester, polyimide, polyetherimide, polystyrene, polyurethane, blends thereof, copolymers thereof, and combinations thereof.

In some aspects the composition further includes one or more additional additives. Suitable additional additives include, but are not limited to, fillers, pigments, whitening agents, optical brighteners, surfactants, processing aids, thermal stabilizers, photochemical stabilizers, and combinations thereof.

The thermoplastic composition including the PMMA and the poly(carbonate-siloxane) copolymer may in some aspects have a notched Izod impact strength as measured in accordance with ASTM D256 at 23° C. that is higher than that of a substantially identical reference composition that does not include the poly(carbonate-siloxane) copolymer. In particular aspects the thermoplastic composition has a notched Izod impact strength as measured in accordance with ASTM D256 at 23° C. that is at least about 100% higher, or at least about 150% higher, or at least about 200% higher, or at least about 250% higher, or at least about 300% higher, or at least about 350% higher, than that of a substantially identical reference composition that does not include the poly(carbonate-siloxane) copolymer.

As used herein, a "substantially identical reference composition" is a composition that includes the same components, and the same amounts of the components, as the example composition, except that the reference composition does not include the recited component (e.g., the poly(carbonate-siloxane) copolymer is omitted). Where one component is removed, the wt % of the removed component is added to the primary polymer in the composition. Thus, if an example composition includes 59 wt % PMMA, 39 wt % poly(carbonate-siloxane) copolymer and 2 wt % other components, a substantially identical reference composition that does not include the poly(carbonate-siloxane) copolymer includes 98 wt % PMMA and 2 wt % of the same other components as the example composition. Further, where the example composition is compared to a substantially identical reference composition that has a different poly(carbonate-siloxane) copolymer (e.g., one with a siloxane content of 50 wt %), the reference composition is otherwise identical to the example composition except that the poly(carbonate-siloxane) copolymer of the example composition is substituted for that of the reference composition.

In certain aspects the thermoplastic composition has a flexural modulus as measured in accordance with ASTM D790 at 23° C. that is lower than that of a substantially identical reference composition that does not include the poly(carbonate-siloxane) copolymer. In certain aspects the thermoplastic composition has a flexural modulus as measured in accordance with ASTM D790 at 23° C. that at least about 10% lower, or at least about 20% lower, or at least about 30% lower, or at least about 40% lower, than that of a substantially identical reference composition that does not include the poly(carbonate-siloxane) copolymer.

In some aspects the thermoplastic composition has a storage modulus of at least about 600 MPa at 25° C. as tested in accordance with ASTM D638. In further aspects the thermoplastic composition has a storage modulus of at least about 1000 megapascals (MPa), or at least about 1500 MPa, or from about 600 to about 2500 MPa, or from about 600 to about 2000 MPa, at 25° C. as tested in accordance with ASTM D638.

The thermoplastic composition may in some aspects have a nano-dispersed poly(carbonate-siloxane) copolymer phase in the PMMA and a single glass transition temperature (Tg).

In further aspects the thermoplastic composition is hydrothermally stable. As used herein, hydrothermally stable means that the composition, after 1000 hours of aging in 60° C. and 95% relative humidity (RH) conditions, has a reduction in transmittance (% T) of less than about 5%, or in some aspects a reduction in % T of less than about 2%, or in particular aspects a reduction in % T of less than about 1%. Hydrothermally stable may also, or in the alternative, mean that the composition, after 1000 hours of aging in 60° C. and 95% relative humidity (RH) conditions, has an increase in haze of less than about 30%, or less than about 25%, or less than about 20%, or less than about 15% or less than about 10%. Transmittance and haze may be determined in accordance with ASTM D1003.

In certain aspects the thermoplastic composition has a transmittance, as tested in accordance with ASTM D1003, that is at least about 5% greater than that of a substantially identical reference thermoplastic composition that includes a poly(carbonate-siloxane) copolymer having a siloxane content of 50 wt %. In further aspects the thermoplastic composition has a transmittance, as tested in accordance with ASTM D1003, that is at least about 10% greater, or from about 5% to about 20% greater, than that of a substantially identical reference thermoplastic composition that includes a poly(carbonate-siloxane) copolymer having a siloxane content of 50 wt %

In some aspects the thermoplastic composition has a haze, as tested in accordance with ASTM D1003, that is at least about 10% lower than that of a substantially identical reference thermoplastic composition that includes a poly(carbonate-siloxane) copolymer having a siloxane content of 50 wt %. In particular aspects the thermoplastic composition has a haze, as tested in accordance with ASTM D1003, that is at least about 12% lower, or at least about 10 wt % to about 60 wt % lower, or at least about 35 wt % to about 60 wt % lower, a than that of a substantially identical reference thermoplastic composition that includes a poly(carbonate-siloxane) copolymer having a siloxane content of 50 wt%.

Methods of Making the Thermoplastic Compositions—Upfront Process

Aspects of the disclosure further relate to methods of making a thermoplastic composition, including: (a) combining from about 30 wt % to about 95 wt % poly(methyl methacrylate) (PMMA) and from about 5 wt % to about 70 wt % of a poly(carbonate-siloxane) copolymer having a siloxane content of from about 25 wt % to about 45 wt % to form a mixture; and (b) melt processing the mixture to polymerize it and form the thermoplastic composition. The PMMA, poly(carbonate-siloxane) copolymer and thermoplastic composition may include any of the components and have any of the properties described herein. For example, in particular aspects the thermoplastic composition formed according to the method includes from about 55 wt % to about 85 wt % PMMA and from about 15 wt % to about 45 wt % of the poly(carbonate-siloxane) copolymer. In a specific aspect the thermoplastic composition formed according to the method includes about 55 wt % to about 65 wt % PMMA and about 35 wt % to about 45 wt % of the poly(carbonate-siloxane) copolymer. In another specific aspect the thermoplastic composition formed according to the method includes about 75 wt % to about 85 wt % PMMA and about 15 wt % to about 25 wt % of the poly(carbonate-siloxane) copolymer.

In particular aspects step (a) of the method is performed prior to polymerization of any of the PMMA and poly(carbonate-siloxane) copolymer. In other words, the PMMA and poly(carbonate-siloxane) copolymer are combined upfront in the reactor during polymerization. In certain aspects the melt processing step (i.e., step (b)) is performed at a temperature of about 240° C., or in some aspects less than about 240° C. The thermoplastic composition may in particular aspects have a nano-dispersed poly(carbonate-siloxane) copolymer phase in the PMMA and a single glass transition temperature (Tg).

Methods of Making the Thermoplastic Compositions—Tube Reactor Process

Further aspects of the disclosure relate to method of forming a thermoplastic composition, including:

(a) forming a poly(carbonate-siloxane) copolymer in a tube reactor process, the tube reactor process including forming siloxane-chloroformate prior to copolymerizing the poly(carbonate-siloxane) copolymer, wherein the poly(carbonate-siloxane) copolymer has a siloxane content of from about 25 wt % to about 45 wt %; and (b) combining from about 5 wt % to about 70 wt % of the poly(carbonate-siloxane) copolymer with from about 30 wt % to about 95 wt % poly(methyl methacrylate) (PMMA) to form the thermoplastic composition.

The PMMA, poly(carbonate-siloxane) copolymer and thermoplastic composition may include any of the components and have any of the properties described herein. For example, in particular aspects the thermoplastic composition formed according to the method includes from about 55 wt % to about 85 wt % PMMA and from about 15 wt % to about 45 wt % of the poly(carbonate-siloxane) copolymer. In a specific aspect the thermoplastic composition formed according to the method includes about 55 wt % to about 65 wt % PMMA and about 35 wt % to about 45 wt % of the poly(carbonate-siloxane) copolymer. In another specific aspect the thermoplastic composition formed according to the method includes about 75 wt % to about 85 wt % PMMA and about 15 wt % to about 25 wt % of the poly(carbonate-siloxane) copolymer.

In particular aspects the poly(carbonate-siloxane) copolymer used in the method has a siloxane content of about 40 wt %. The thermoplastic composition may have a single glass transition temperature (Tg) and/or a nano-dispersed poly(carbonate-siloxane) copolymer phase in the PMMA. One or both of the steps of the method may be performed at a temperature of about 240° C., or in certain aspects at a temperature of less than about 240° C.

Tube reactor processes are described in U.S. Patent Application Publication No. 2004/0039145, U.S. Pat. Nos. 6,723,864, and 8,466,249, the disclosures of which are incorporated herein by this reference in their entireties. The poly(carbonate-siloxane) copolymer in some aspects is formed according to one or more of the processes described in these disclosures. It has been found that PC-Si copolymers polymerized in a tube process may be blended with PMMA to produce transparent and flexible compositions and articles such as those described herein. In general terms, the tube process differs from upfront siloxane addition in that siloxane is pre-reacted into Si-chloroformate in a tube, which allows for controlled distribution of the polycarbonate and siloxane blocks. In some aspects there are no (or substantially no) no adjacent siloxane blocks in the poly(carbonate-siloxane) copolymer. Incorporating a tube process into the method may in some aspects provide flexibility to manufacturing operations.

Articles Including the Thermoplastic Composition

Aspects of the disclosure also relate to articles including the thermoplastic composition described herein. In some aspects the article is a film, a sheet, a molded article, a welded article, a filament or a powder. In particular aspects the article is a film for a consumer electronics device.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:

from about 30 wt % to about 95 wt % poly(methyl methacrylate) (PMMA); and from about 5 wt % to about 70 wt % of a poly(carbonate-siloxane) copolymer having a siloxane content of from about 25 wt % to about 45 wt %.

Aspect 2. The thermoplastic composition according to Aspect 1, wherein the poly(carbonate-siloxane) copolymer has a siloxane content of about 40 wt %.

Aspect 3. The thermoplastic composition according to Aspect 1 or 2, wherein the composition is transparent.

Aspect 4. The thermoplastic composition according to any of Aspects 1 to 3, wherein the composition is flexible.

Aspect 5. The thermoplastic composition according to any of Aspects 1 to 4, wherein the composition further comprises one or more additional polymers.

Aspect 6. The thermoplastic composition according to Aspect 5, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof, copolymers thereof, and combinations thereof.

Aspect 7. The thermoplastic composition according to any of Aspects 1 to 6, wherein the composition further comprises one or more additional additives.

Aspect 8. The thermoplastic composition according to Aspect 7, wherein the one or more additional additives is selected from the group consisting of: a filler; a pigment; a whitening agent; an optical brightener; a surfactant; a processing aid; a thermal stabilizer; a photochemical stabilizer; and combinations thereof.

Aspect 9. The thermoplastic composition according to any of Aspects 1 to 8, wherein the composition has a notched Izod impact strength as measured in accordance with ASTM D256 at 23° C. that is higher than that of a substantially identical reference composition that does not include the poly(carbonate-siloxane) copolymer.

Aspect 10. The thermoplastic composition according to any of Aspects 1 to 9, wherein the composition has a flexural modulus as measured in accordance with ASTM D790 at 23° C. that is lower than that of a substantially identical reference composition that does not include the poly(carbonate-siloxane) copolymer.

Aspect 11. The thermoplastic composition according to any of Aspects 1 to 10, wherein the composition has a nano-dispersed poly(carbonate-siloxane) copolymer phase in the PMMA and a single glass transition temperature (Tg).

Aspect 12. The thermoplastic composition according to any of Aspects 1 to 11, wherein the composition is hydrothermally stable.

Aspect 13. The thermoplastic composition according to any of Aspects 1 to 12, wherein the composition has a storage modulus of at least about 600 MPa at 25° C. as tested in accordance with ASTM D638.

Aspect 13A. The thermoplastic composition according to any of Aspects 1 to 13, wherein the composition comprises from about 55 wt % to about 85 wt % PMMA and from about 15 wt % to about 45 wt % of the poly(carbonate-siloxane) copolymer.

Aspect 14. A method of making a thermoplastic composition, comprising, consisting of, or consisting essentially of:
(a) combining from about 30 wt % to about 95 wt % poly(methyl methacrylate) (PMMA) and from about 5 wt % to about 70 wt % of a poly(carbonate-siloxane) copolymer having a siloxane content of from about 25 wt % to about 45 wt % to form a mixture; and
(b) melt processing the mixture to polymerize it and form the thermoplastic composition.

Aspect 15. The method according to Aspect 14, wherein step (a) is performed prior to polymerization of any of the PMMA and poly(carbonate-siloxane) copolymer.

Aspect 16. The method according to Aspect 14 or 15, wherein step (b) is performed at a temperature of less than about 240° C.

Aspect 17. The method according to any of Aspects 14 to 16, wherein the thermoplastic composition has a nano-dispersed poly(carbonate-siloxane) copolymer phase in the PMMA and a single glass transition temperature (Tg).

Aspect 18. The method according to any of Aspects 14 to 17, wherein the poly(carbonate-siloxane) copolymer has a siloxane content of about 40 wt %.

Aspect 19. The method according to any of Aspects 14 to 18, wherein the composition is transparent.

Aspect 20. The method according to any of Aspects 14 to 19, wherein the composition is flexible.

Aspect 21. The method according to any of Aspects 14 to 20, wherein the composition further comprises one or more additional polymers.

Aspect 22. The method according to Aspect 21, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof, copolymers thereof, and combinations thereof.

Aspect 23. The method according to any of Aspects 14 to 22, wherein the composition further comprises one or more additional additives.

Aspect 24. The method according to Aspect 23, wherein the one or more additional additives is selected from the group consisting of: a filler; a pigment; a whitening agent; an optical brightener; a surfactant; a processing aid; a thermal stabilizer; a photochemical stabilizer; and combinations thereof.

Aspect 25. The method according to any of Aspects 14 to 24, wherein the composition has a notched Izod impact strength as measured in accordance with ASTM D256 at 23° C. that is higher than that of a substantially identical reference composition that does not include the poly(carbonate-siloxane) copolymer.

Aspect 26. The method according to any of Aspects 14 to 25, wherein the composition has a flexural modulus as measured in accordance with ASTM D790 at 23° C. that is lower than that of a substantially identical reference composition that does not include the poly(carbonate-siloxane) copolymer.

Aspect 27. The method according to any of Aspects 14 to 26, wherein the composition is hydrothermally stable.

Aspect 28. The method according to any of Aspects 14 to 27, wherein the composition has a storage modulus of at least about 600 MPa at 25° C. as tested in accordance with ASTM D638.

Aspect 28A. The method according to any of Aspects 14 to 28, wherein the composition comprises from about 55 wt % to about 85 wt % PMMA and from about 15 wt % to about 45 wt % of the poly(carbonate-siloxane) copolymer.

Aspect 29. A method of forming a thermoplastic composition, comprising, consisting of, or consisting essentially of:
(a) forming a poly(carbonate-siloxane) copolymer in a tube reactor process, the tube reactor process comprising forming siloxane-chloroformate prior to copolymerizing the poly(carbonate-siloxane) copolymer, wherein the poly(carbonate-siloxane) copolymer has a siloxane content of from about 25 wt % to about 45 wt %; and
(b) combining from about 5 wt % to about 70 wt % of the poly(carbonate-siloxane) copolymer with from about 30 wt % to about 95 wt % poly(methyl methacrylate) (PMMA) to form the thermoplastic composition.

Aspect 30. The method according to Aspect 29, wherein the poly(carbonate-siloxane) copolymer has a siloxane content of about 40 wt %.

Aspect 31. The method according to Aspect 29 or 30, wherein the thermoplastic composition has a single glass transition temperature (Tg).

Aspect 32. The method according to Aspect any of Aspects 29 to 31, wherein step (a) is performed at a temperature of less than 240° C.

Aspect 33. The method according to any of Aspects 29 to 32, wherein the thermoplastic composition further comprises one or more additional polymers.

Aspect 34. The method according to Aspect 33, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof, copolymers thereof, and combinations thereof.

Aspect 35. The method according to any of Aspects 29 to 34, wherein the thermoplastic composition further comprises one or more additional additives.

Aspect 36. The method according to Aspect 35, wherein the one or more additional additives is selected from the group consisting of: a filler; a pigment; a whitening agent; an optical brightener; a surfactant; a processing aid; a thermal stabilizer; a photochemical stabilizer; and combinations thereof.

Aspect 37. The method according to any of Aspects 29 to 36, wherein the thermoplastic composition has a transmittance, as tested in accordance with ASTM D1003, that is at least 5% greater than that of a substantially identical reference thermoplastic composition that includes a poly(carbonate-siloxane) copolymer having a siloxane content of 50 wt %.

Aspect 38. The method according to any of Aspects 29 to 37, wherein the thermoplastic composition has a haze, as tested in accordance with ASTM D1003, that is at least 10% lower than that of a substantially identical reference thermoplastic composition that includes a poly(carbonate-siloxane) copolymer having a siloxane content of 50 wt %.

Aspect 38A. The method according to any of Aspects 29 to 38, wherein the thermoplastic composition comprises from about 55 wt % to about 85 wt % PMMA and from about 15 wt % to about 45 wt % of the poly(carbonate-siloxane) copolymer.

Aspect 39. An article comprising the thermoplastic composition according to any of Aspects 1 to 38A.

Aspect 40. The article according to Aspect 39, wherein the article comprises a film, a sheet, a molded article, a welded article, a filament or a powder.

Aspect 41. The article according to Aspect 39, wherein the article is a film for a consumer electronics device.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Compositions described herein included materials set forth below in Table 1:

TABLE 1

| Materials | |
|---|---|
| Component | Source |
| PMMA - POQ66 | Evonik |
| PMMA Plexiglas ® V920A | Arkema |

TABLE 1-continued

| Materials | |
|---|---|
| Component | Source |
| PC-Siloxane copolymer (40% siloxane content) | SABIC |
| PC-Siloxane copolymer (20% siloxane content) - C9030P | SABIC |
| PC-Siloxane copolymer (6.5% siloxane content) - C9030T | SABIC |
| PC-Siloxane copolymer (60% siloxane content) | SABIC |
| PC-Siloxane copolymer (50% siloxane content) | SABIC |
| Optical quality PC (OQPC) | SABIC |
| Lexan ™ 121R PC | SABIC |

Pellets of the composition were extruded according to one of the following:
Brabender Intelli-Torque Plasti-Corder® Torque Rheometer with conical twin screws (#404 and 403), 240 degrees Celsius (° C.), 3 kilogram (kg) blend size
DSM Xplore 15 cc micro extruder, 240° C., 40 gram (g) blend size The pellets were compression molded using a Carver press at 240° C. (the C9030T and C9030P blends were processed at 260° C.).

Dynamic Mechanical Analysis (DMA): the dynamic thermos-mechanical properties of the materials were measured with a DMA Q800 analyzer (TA instruments). The tension mode was used with a frequency of 1 hertz (Hz), at a strain level of 0.01%, in a temperature range from −120° C. to 200° C. The heating rate was 3° C./min. The testing was performed by using rectangular bars having a thickness of from about 0.5 millimeter (mm) to 1.0 mm.

Parallel Plate Oscillatory Rheology: Melt Rheology. The dynamic oscillatory frequency sweeps were run using an ARES strain-controlled rheometer. The frequency sweep method is used to determine the viscosity or modulus of a material as a function of frequency at a constant temperature (240° C.). The measurements were performed using 25 mm parallel-plate geometry at a 3% strain with a fixed gap of 1 mm. The frequency was varied from 0.1 radian per second (rad/s) to 500 rad/s.

Example Compositions

As shown in FIGS. 2A, 2B, transparent blends of PMMA and PC-Si copolymer (40% Si content) were produced across a wide resin ratio range:

TABLE 2A

| Varying Amounts of PMMA/PC-Si Copolymer | | | | | | | |
|---|---|---|---|---|---|---|---|
| Formulation | C2.1 | Ex2.1 | Ex2.2 | Ex2.3 | Ex2.4 | Ex2.5 | Ex2.6 |
| PMMA | 100 | 95 | 90 | 80 | 80 | 70 | 60 |
| PC-Si (40% Si content) | | 5 | 10 | 20 | 20 | 30 | 40 |
| Conditions | | | | | | | |
| Physical form: pellet/powder | p | p/pwd | p/pwd | p/pwd | pwd/pwd | p/pwd | p/pwd |
| Extruder | Micro | Micro | Micro | Micro | Brabender | Micro | Micro |
| Melt Temp ° C. | 220 | 220 | 220 | 220 | 230 | 220 | 220 |
| Performance: | | | | | | | |
| Clear, Haze, High Haze, Opaque, Brittle, Flexible, Ductile, DeLaminated | C, B | C, B | C, B | C, H, F | C, H, F | C, H, F | C, H, F |

TABLE 2B

Varying Amounts of PMMA/PC-Si Copolymer

| Formulation | Ex2.7 | Ex2.8 | Ex2.9 | Ex2.10 | C2.2 |
|---|---|---|---|---|---|
| PMMA | 60 | 50 | 40 | 30 | 20 |
| PC-Si (40% Si content) | 40 | 50 | 60 | 70 | 80 |
| Conditions | | | | | |
| Physical form: pellet/powder | pwd/pwd | pwd/pwd | pwd/pwd | p/pwd | p/pwd |
| Extruder | Brabender | Micro | Micro | Micro | Micro |
| Melt Temp ° C. | 230 | 220 | 220 | 220 | 220 |
| Performance | | | | | |
| Clear, Haze, High Haze, Opaque, Brittle, Flexible, Ductile, DeLaminated | C, H, F | C, H, F | C, H, F | C, H, F | HH, D, DL |

As noted, the blends having 20-60% PC-Si were flexible; they also had a flexural modulus lower than PMMA (Ex2.3-Ex2.9). Some haze was present in these blends, and haze increased visually with increasing levels of PC-Si. For example, the 30/70 PMMA/PC-Si (Ex2.10) blend had more haze visually than the 60/40 blend (Ex2.7). The 20/80 PMMA/PC-Si (C2.2) blend exhibited evidence of delamination in the extruded strand.

Comparative and Example compositions are shown in Table 3A, including examples including a PC-Si copolymer having an Si content of 6.5%, 200% and 60%:

TABLE 3A

Compositions Including Different Siloxane Types

| | Ex3.1 | Ex3.2 | C3.1 | C3.2 | C3.3 | C3.4 | C3.5 | C3.6 |
|---|---|---|---|---|---|---|---|---|
| PMMA | 60 | 80 | 100 | | 60 | 60 | 60 | |
| PC-Si (40% Si content) | 40 | 20 | | | | | | 40 |
| Lexan ™ 121R PC | | | | 100 | | | | |
| PC-Si (6.5% Si content) C9030T | | | | | 40 | | | |
| PC-Si (20% Si content) C9030P | | | | | | 40 | | |
| PC-Si (60% Si content) | | | | | | | 40 | |
| Optical Quality PC (OQPC) | | | | | | | | 60 |
| *Microextrusion* | | | | | | | | |
| Copolymer Siloxane wt % | 40 | 40 | N/A | N/A | 6.5 | 20 | 60 | 40 |
| Overall Siloxane Content wt % | 16 | 8 | N/A | N/A | 2.6 | 8 | 24 | 16 |
| % T 2.2 mm ASTM D1003 Compression molded plaque | 82.7 | 89.1 | 94.0 | 86.0 | 16.2 | 31.0 | 46.4 | 12.2 |
| Haze 2.2 mm Compression molded plaque | 33.0 | 12.0 | 4.0 | 10.5 | | | | |
| % T 1.2 mm ASTM D1003 Compression molded plaque | 87.1 | 91.7 | 94.0 | 89.2 | 32.5 | 48.5 | 56.8 | 25.2 |
| Haze 1.2 mm Compression molded plaque | 14.1 | 6.5 | 4.0 | 7.2 | | | | |
| Appearance: Transparent (T), Minor haze (H), Opaque (O) | T, H | T, H | T | T | O | O | O | O |
| *Brabender Extrusion* | | | | | | | | |
| Izod Impact- Notched ASTM D256 lbft/ft at 23° C. | 170 | 93 | 35 | 156 | — | — | — | — |
| Izod Impact-Unnotched ASTM D4812 lbft/ft at 23° C. | 986 | 585 | 220 | 720 | — | — | — | — |
| Flexural modulus ASTM D790 in MPa | 1930 | 2520 | 3220 | 2340 | — | | — | — |

TABLE 3A-continued

Compositions Including Different Siloxane Types

|  | Ex3.1 | Ex3.2 | C3.1 | C3.2 | C3.3 | C3.4 | C3.5 | C3.6 |
|---|---|---|---|---|---|---|---|---|
| Flexural Stress at break ASTM D790 in MPa | No Break | No Break | 86 | No Break | — | — | — | — |
| Tg DMA ° C. | 123 | 121 | 115 |  |  |  |  |  |

Transparency in PMMA blends is confined to a narrow compositional range. For example, an opaque blend was produced when the siloxane copolymer (C9030T) included only 6.5 wt % siloxane in the copolymer (C3.3). Likewise, an opaque blend was produced when the copolymer siloxane content was increased to 20 wt % (C3.4). Transparent blends, however, were produced when the siloxane content in the copolymer was around 40 wt % (Ex3.1, Ex3.2). Once the copolymer siloxane content was increased to 60 wt %, however, the blend was again opaque.

PMMA/siloxane copolymer transparency is uniquely derived from the siloxane copolymer and is not achievable by simply blending a targeted level of siloxane from other siloxane copolymers known in the art. For instance, Ex3.2 and comparative example C3.4 each included the average siloxane level of 8 wt % after blending, while only the 80/20 PMMA/PC-Si (40% Si content) (Ex3.2) was transparent.

The PMMA/PC-Si (40% Si content) blends possessed high impact energy and low flexural modulus. The 60/40 PMMA/PC-Si (40% Si content) (Ex3.1) sample had an Izod impact energy that was greater than 100% Lexan 121R (C3.2) and substantially greater than 100% PMMA (C3.1). In addition, the blend had lower flexural modulus compared to both Lexan 121R and POQ66 PMMA (Table 3). It was noted that the Izod impact breaks for Ex. 3.1 and Ex3.2 were brittle.

Given the lower modulus of PMMA/PC-Si (40% Si content) and low processing temperature, such blends are expected to be a good resin matrix for photochromic dyes. Other dyes such as 3-hydroxy flavone fluorophores would be expected to benefit from the lower processing temperature compared to polycarbonate.

Overall, the example compositions described above were flexible, while rapid impact (Izod) results in brittle breaks.

Figure 2:
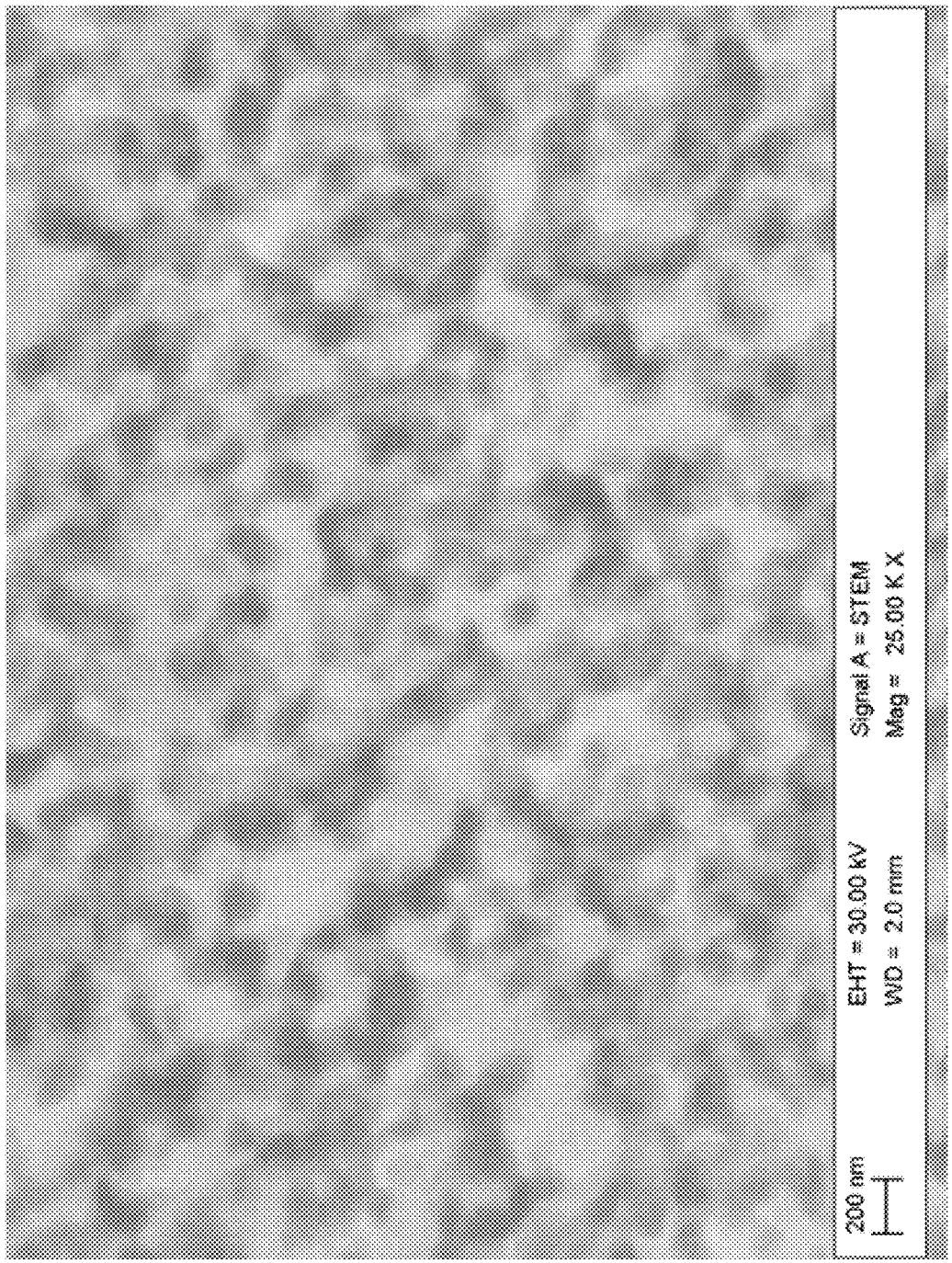
FIG. 2 is a STEM image of a 60/40 PMMA/PC-Si (40% siloxane content) composition.
Figure 3:
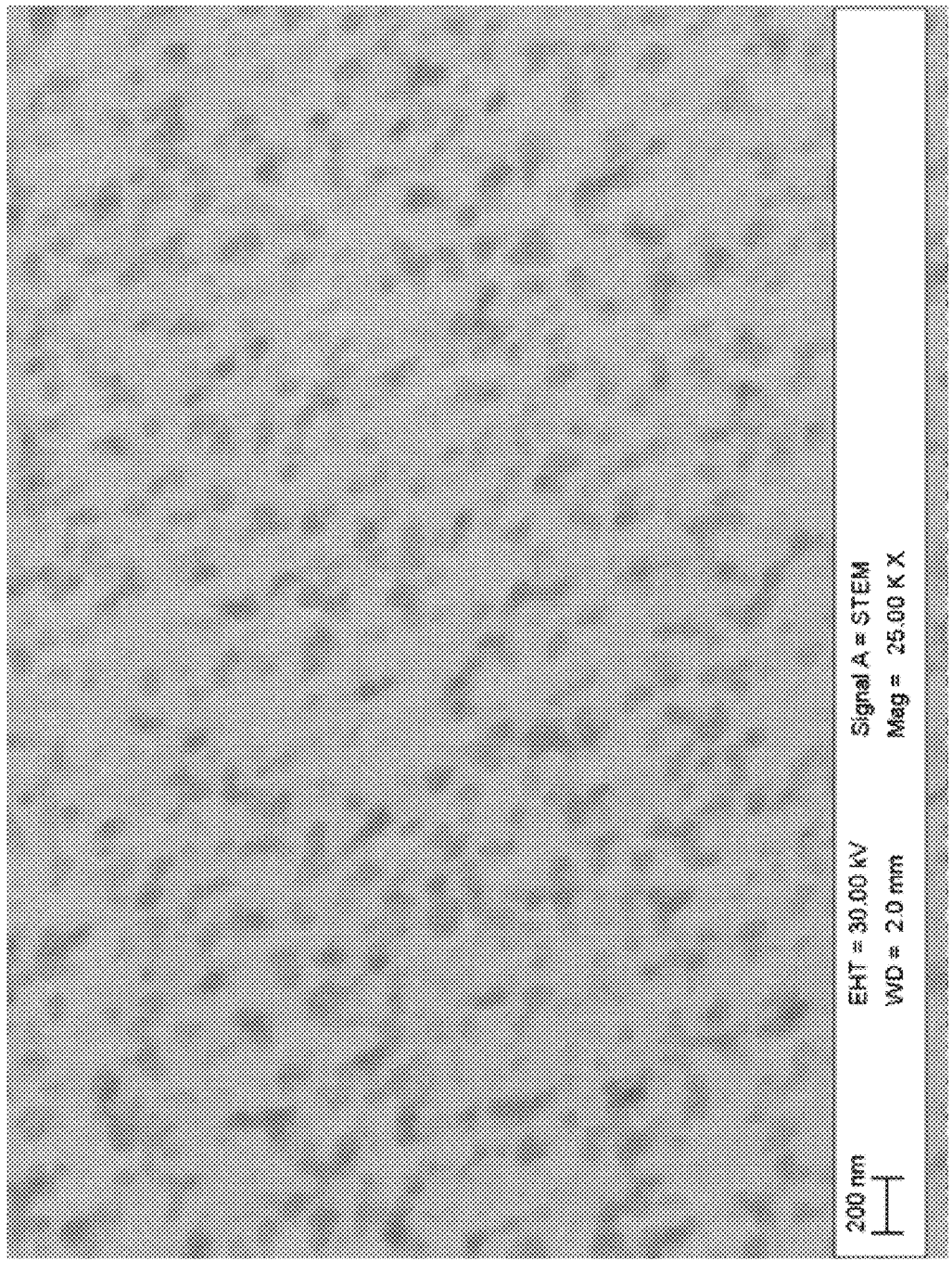
FIG. 3 is a STEM image of an 80/20 PMMA/PC-Si (40% siloxane content) composition.
Figure 4:
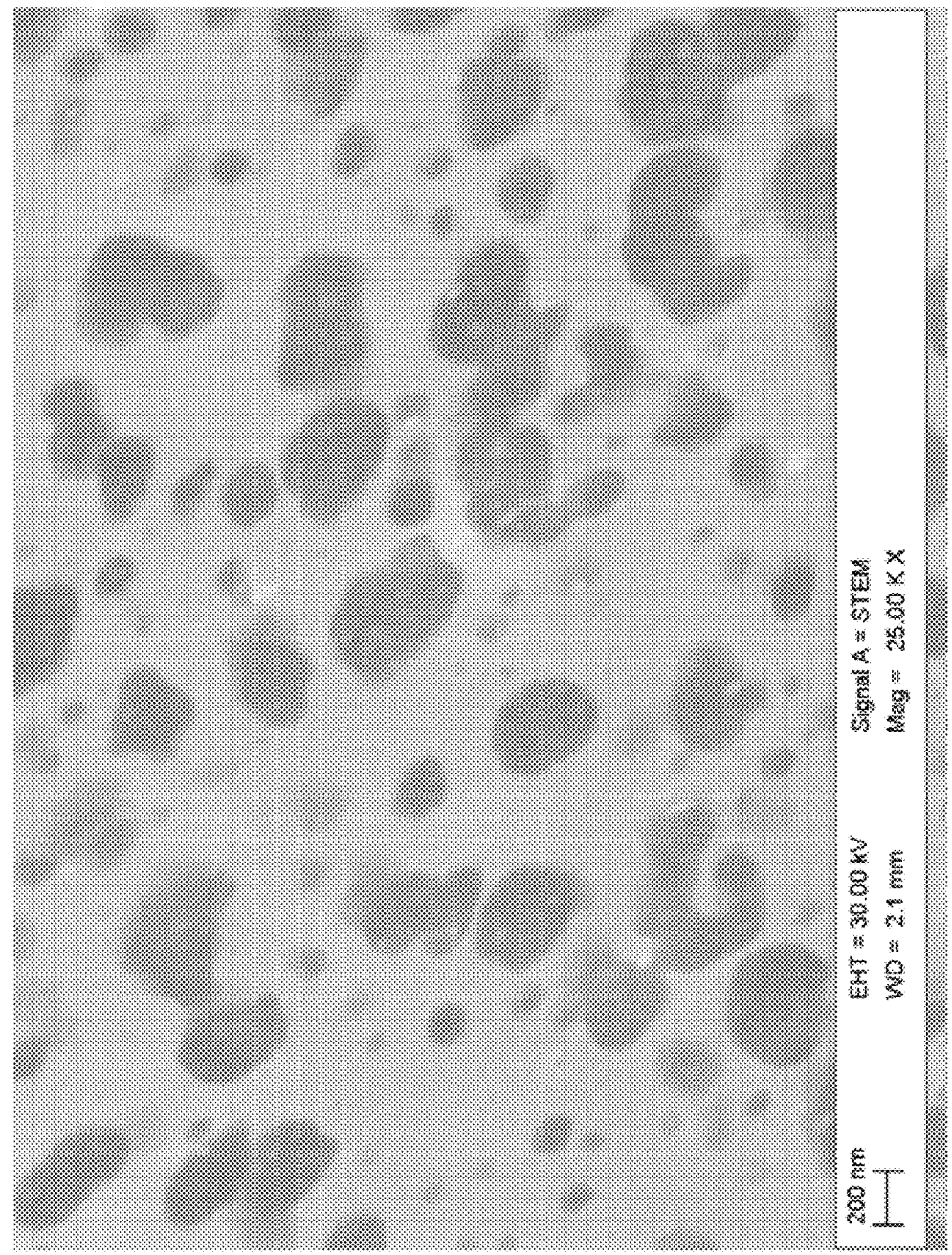
FIG. 4 is a STEM image of a 60/40 PMMA/PC-Si (20% siloxane content) composition.

In addition, the example compositions have uniformly dispersed PC-Si copolymer regions; see the STEM images in FIGS. 2 and 3. The siloxane copolymer phase is around 200 nanometers (nm) or less and can be co-continuous or formed by discrete copolymer particles. Transparency is made possible given the nano-sized copolymer phase in PMMA even though the refractive indices are quite different (1.49 for PMMA and 1.58 for polycarbonates). When the siloxane copolymer phase is in the range of visible light wavelengths, white light scattering occurs due to refractive index change at the polymer-polymer boundary. The larger phase size results in an opaque white appearance; see the STEM image in FIG. 4.

Additional comparative and example compositions including various amounts and types of PC-Si copolymer were prepared and tested as shown in Tables 3B and 3C:

TABLE 3B

Compositions having no PC-Si (40% Si content)

| Item Description | Unit | C3.7 | C3.8 | C3.9 | C3.10 | C3.11 | C3.12 | C3.13 | C3.14 |
|---|---|---|---|---|---|---|---|---|---|
| PMMA, Plexiglass V920A | % | 84.6 | 69.6 | 54.6 | 9.6 | 99.6 | 94.6 | 54.6 | 29.6 |
| PC-Si (60% Si content) | % | 15.0 | 30.0 |  |  |  |  |  |  |
| PC-Si (40% Si content) | % | — | — |  |  |  |  |  |  |
| PC-Si (20% Si content) (C9030P) | % |  |  | 45.0 | 90.0 |  |  |  |  |
| PC Resin 130 Grade with PCP Endcap | % |  |  |  |  |  | 5 | 45 | 70 |
| Hindered Phenol Stabilizer | % | 0.3 | 0.3 | 0.3 | 0.3 | 0.3 | 0.3 | 0.3 | 0.3 |
| Phosphite Stabilizer | % | 0.1 | 0.1 | 0.1 | 0.1 | 0.1 | 0.1 | 0.1 | 0.1 |
| Total Siloxane Content | % | 9 | 18 | 9 | 18 | — | — | — | — |
| Properties |  |  |  |  |  |  |  |  |  |
| % Transmission - Avg | % | 39.0 | 43.6 | 20.1 | 18.8 | 91.2 | 37.5 | 6.3 | 7.9 |
| % Haze - Avg | % | 98.9 | 98.4 | 99.2 | 99.2 | 3.1 | 99.2 | 99.3 | 99.4 |
| Izod Impact, ASTM D256, ASTM D4812 23° C. |  |  |  |  |  |  |  |  |  |
| Ductility | % | 0 | 0 | 0 | 100 | 0 | 0 | 0 | 0 |
| Impact Strength- Avg | J/m | 40 | 57 | 108 | 618 | 24 | 35 | 61 | 146 |
| Izod Impact, ASTM D256, ASTM D4812 0° C. |  |  |  |  |  |  |  |  |  |
| Ductility | % | X | X | X | 100 | X | X | X | X |
| Impact Strength- Avg | J/m | X | X | X | 547 | X | X | X | X |
| Izod Impact, ASTM D256, ASTM D4812 −20° C. |  |  |  |  |  |  |  |  |  |
| Ductility | % | X | X | X | 100 | X | X | X | X |
| Impact Strength- Avg | J/m | X | X | X | 482 | X | X | X | X |
| HDT (Avg), ASTM D648 | ° C. | 89.9 | 88.7 | 101.2 | 120.5 | 92.5 | 96.3 | 109.1 | 132.2 |
| Tensile properties, |  |  |  |  |  |  |  |  |  |

TABLE 3B-continued

Compositions having no PC-Si (40% Si content)

| Item Description | Unit | C3.7 | C3.8 | C3.9 | C3.10 | C3.11 | C3.12 | C3.13 | C3.14 |
|---|---|---|---|---|---|---|---|---|---|
| ASTM D 638, Uniaxial tensile test | | | | | | | | | |
| Modulus of Elasticity-Avg | MPa | 2698 | 2260 | 2380 | 1706 | 3186 | 3294 | 2884 | 2602 |
| Tensile Strength at Yield-Avg | MPa | 58.8 | 48.1 | 55.7 | 31.6 | 70.6 | | 75.8 | 71.6 |
| Tensile Strength at Break-Avg | MPa | 44.2 | 39.0 | 45.6 | 18.4 | 69.0 | 68.9 | 52.7 | 54.5 |
| % Elongation at Yield-Avg | % | 5.54 | 5.48 | 5.47 | 3.81 | 5.87 | | 6.55 | 6.84 |
| % Elongation at Break-Avg | % | 28.32 | 30.62 | 32.64 | 4.58 | 7.04 | 2.96 | 52.73 | 37.48 |

TABLE 3C

Compositions Including PC-Si (40% Si content)

| Item Description | Unit | Ex3.3 | Ex3.4 | Ex3.5 | Ex3.6 | Ex3.7 | C3.15 |
|---|---|---|---|---|---|---|---|
| PMMA, Plexiglass V920A | % | 94.6 | 77.1 | 59.6 | 54.6 | 29.6 | 9.6 |
| PC-Si (60% Si content) | % | — | — | — | — | — | — |
| PC-Si (40% Si content) | % | 5.0 | 22.5 | 40 | 45.0 | 70.0 | 90.0 |
| PC-Si (20% Si content) (C9030P) | % | — | — | — | — | — | — |
| PC Resin 130 Grade with PCP endcap | % | — | — | — | — | — | — |
| Hindered Phenol Stabilizer | % | 0.3 | 0.3 | 0.3 | 0.3 | 0.3 | 0.3 |
| Phosphite Stabilizer | % | 0.1 | 0.1 | 0.1 | 0.1 | 0.1 | 0.1 |
| Total Siloxane Content | % | 2 | 9 | 16 | 18 | 28 | 36 |
| Properties | | | | | | | |
| % Transmission - Avg | % | 86.4 | 81.8 | 79.5 | 76.3 | 78.7 | NC |
| % Haze - Avg | % | 44.9 | 12.9 | 15.8 | 57.7 | 22.6 | |
| Izod Impact, ASTM D256, ASTM D4812 23° C. | | | | | | | |
| Ductility | % | 0 | 0 | 0 | 0 | 100 | X |
| Impact Strength-Avg | J/m | 44 | 84 | 120 | 148 | 300 | X |
| Izod Impact, ASTM D256, ASTM D4812 0° C. | | | | | | | |
| Ductility | % | X | X | X | X | | X |
| Impact Strength-Avg | J/m | X | X | X | X | | X |
| Izod Impact, ASTM D256, ASTM D4812 −20° C. | | | | | | | |
| Ductility | % | X | X | X | X | | X |
| Impact Strength-Avg | J/m | X | X | X | X | | X |
| HDT (Avg) - ASTM D 648 | ° C. | 93.8 | 92.6 | 94.5 | 91.3 | 97.0 | X |
| Tensile properties ASTM D 638, Uniaxial tensile test | | | | | | | |
| Modulus of Elasticity-Avg | MPa | 3182 | 2416 | 2000 | 1504 | 1616 | X |
| Tensile Strength at Yield-Avg | MPa | 76.4 | 53.0 | 44.9 | 35.5 | 40.6 | X |
| Tensile Strength at Break-Avg | MPa | 73.0 | 43.8 | 37.8 | 34.5 | 36.8 | X |
| % Elongation at Yield-Avg | % | 5.7 | 5.36 | 5.75 | 5.91 | 6.11 | X |
| % Elongation at Break-Avg | % | 8.38 | 23.7 | 28.47 | 75.2 | 54.11 | X |

NC = Not compatible

From this data, it is apparent that none of the samples including PC-Si (60% Si content) or PC-Si (20% Si content) are transparent; all of comparative compositions C3.7-C3.10 had a transparency less than 60% at a 3.2 mm thickness. In contrast, all of the example compositions less than 90% PC-Si (40% Si content) (Ex3.3-Ex3.7) were transparent with a % transmission greater than 75%.

In addition, the example compositions having greater than 5% PC-Si (40% Si content) had a notched Izod impact strength of greater than 75 J/m at 23° C. and an elongation at break greater than 20% (see Ex3.4-Ex3.7).

Transparent blends of PMMA and PC-Si (40% Si content) additionally possesses superior hydrothermal aging properties compared to PMMA. After 24 hours (hrs) of hydrothermal exposure at 60° C. and 95% relative humidity (RH), the PMMA was brittle and warped. In contrast, the PMMA/PC-Si (40% Si content) had much improved aging properties at up to 1000 hours. Aging data for 140 micron and 340 micron samples of 60/40 PMMA/PC-Si (40% Si content) composition is shown in Table 4. Aging was again performed at 60° C. and 95% RH:

TABLE 4

| | Hydrothermal Aging | | | |
|---|---|---|---|---|
| | 340 micron | | 140 micron | |
| Aging time (hrs) | % T avg | Haze avg | % T avg | Haze avg |
| 0 | 92.0 | 10.0 | 93.5 | 4.2 |
| 250 | 91.6 | 15.0 | 93.0 | 6.3 |
| 500 | 91.7 | 10.6 | 92.8 | 5.3 |
| 750 | 91.3 | 13.8 | 92.7 | 6.1 |
| 1000 | 91.1 | 14.6 | 92.7 | 6.4 |

From Table 4 it was observed that the example compositions had good transparency, haze and flexibility at up to 1000 hours aging at 60° C. and 95% RH.

Figure 5:
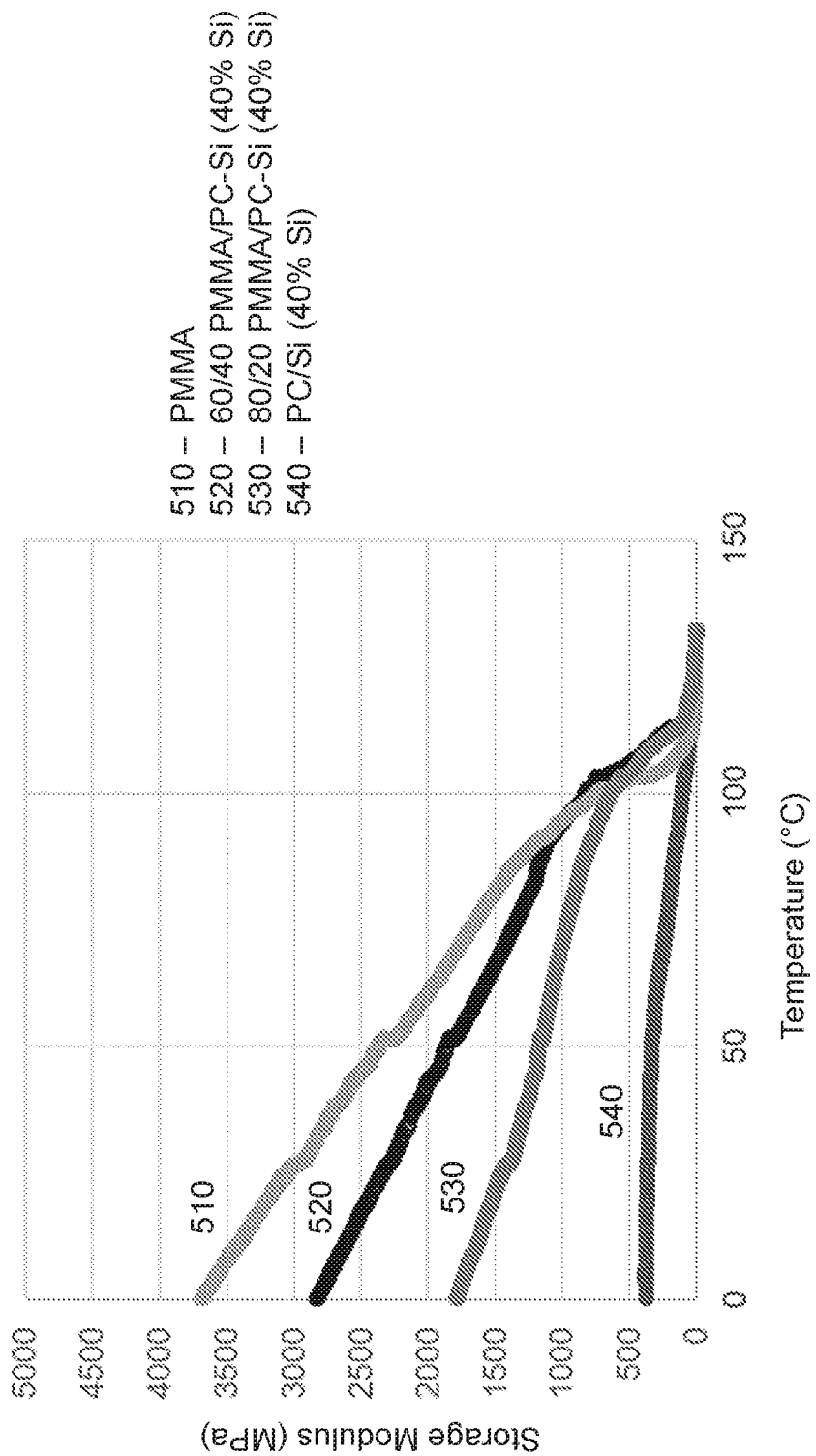
FIG. 5 is a graph of storage modulus vs. temperature for various blends of thermoplastic polymers.

Further, as shown in Table 5 and FIG. 5, storage modulus is significantly reduced as siloxane content increases. This decrease in modulus indicates the improved ductility and impact strength of PC-Si copolymer blends. These results correlate well with the Izod impact data described above (see Table 3). The glass transition temperature (Tg) of the example compositions was also considered; results are shown in Table 5; additional Tg data is shown in FIG. 1.

TABLE 5

| Mechanical Response and Rheology (processability) at 240° C. | | | | |
|---|---|---|---|---|
| Sample | Storage Modulus (MPa) at 25° C. | Tg (° C.) | Viscosity at 0.3 rad/s | Rheology Ratio |
| PMMA | 3500 | 115 | 3760 | 2.8 |
| 80/20 PMMA/PC-Si (40% Si) | 2300 | 121 | 8100 | 3.4 |
| 60/40 PMMA/PC-Si (40% Si) | 1400 | 123 | 33890 | 4.5 |
| PC-Si (40% Si) | 400 | 124 | Not Processable | Not Processable |

Figure 6:
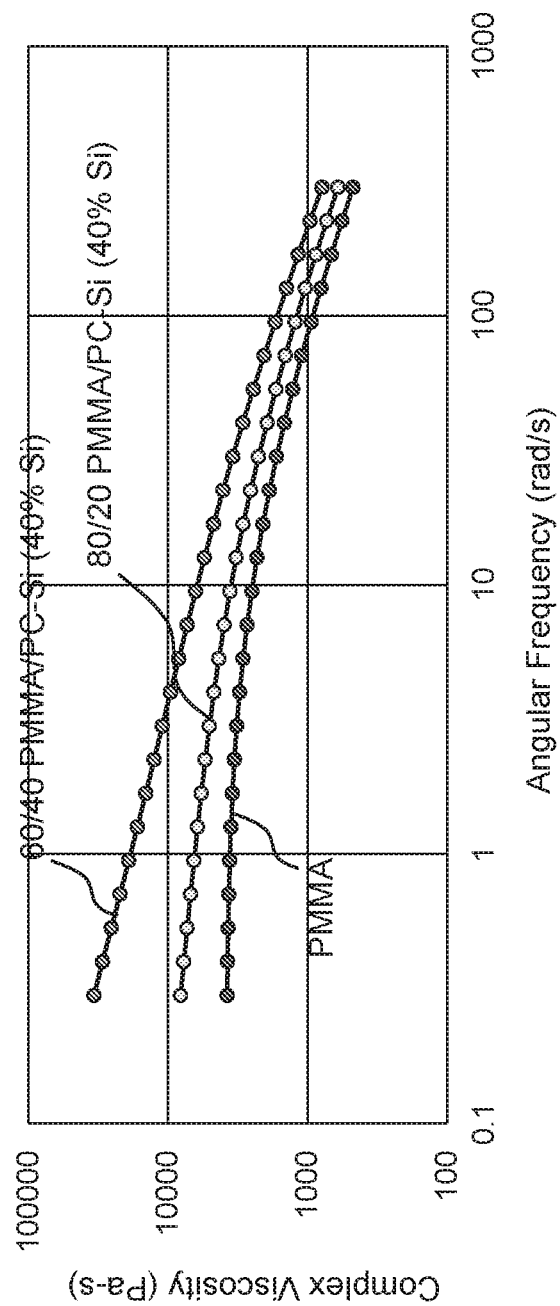
FIG. 6 is a graph of viscosity as a function of angular frequency for various blends of thermoplastic polymers.

A graph of viscosity as a function of angular frequency is shown in FIG. 6. The PC-Si copolymer blends showed an improved melt strength with good processability (i.e., a large decrease in viscosity with shear). The shear-thinning index is demonstrated through a rheology ratio (viscosity at 10 rad/s/viscosity at 100 rad/s). As shown in Table 5, the rheology ratio significantly increases with siloxane content. The 100% PC-Si (40% Si) sample was not processable at 240° C. and is not included in FIG. 6.

Figure 7:
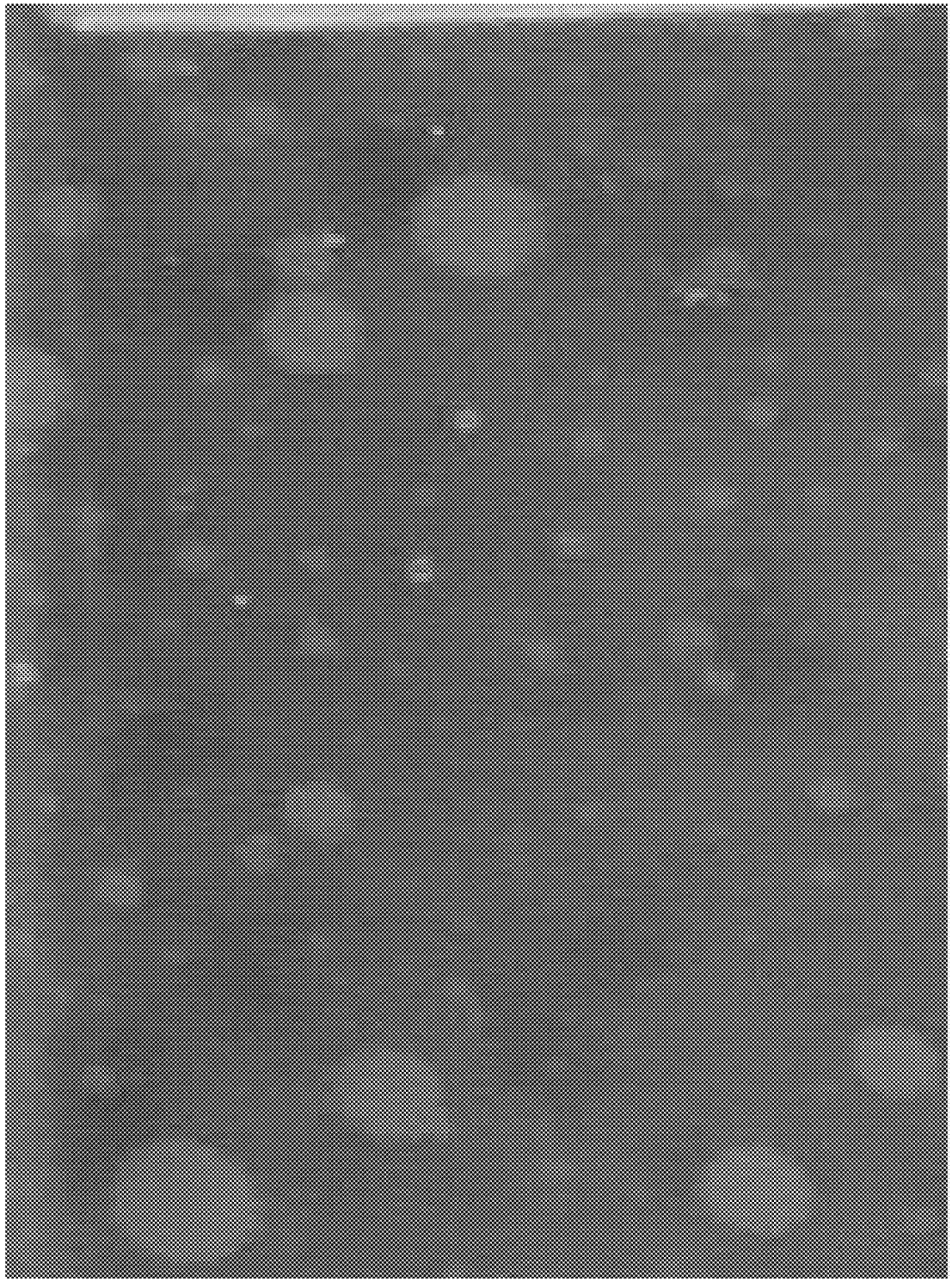
FIG. 7 is an image of a solvent cast film including 60/40 PMMA/PC-Si (40% siloxane content).

Melt extrusion may be a desirable method to achieve adequate and uniform transparency. By comparison, a solvent cast film such as that shown in FIG. 7 (60/40 PMMA/PC-Si (40% Si content) cast from $CH_2Cl_2$) has cloudy white circles that detract from good optical quality. The same film cast using 100% PC-Si copolymer (40% Si content) is transparent with a uniform haze level of 12%.

Example compositions using a tube reactor process were also formed. In the tube reactor process, siloxane-chloroformate was first formed and then the poly(carbonate-siloxane) copolymer was polymerized. The poly(carbonate-siloxane) copolymer was then combined with PMMA and extruded to parts having a thickness of 2.2 mm to form the composition. The compositions are shown in Table 7:

TABLE 6

| Compositions Formed Using Tube Reactor Process | | | | | | | | |
|---|---|---|---|---|---|---|---|---|
| | C6.1 | Ex6.1 | | C6.2 | Ex6.2 | | C6.3 | Ex6.3 |
| Component | | | | | | | | |
| PMMA | 60 | 60 | | 80 | 80 | | 95 | 95 |
| PC-Si (40% Si) | | 40 | | | 20 | | | 5 |
| PC-Si (50% Si) | 40 | | | 20 | | | 5 | |
| Property | | | Δ (%) | | | Δ (%) | | | Δ (%) |
| % T | 72.9 | 80.1 | +10 | 75.6 | 86.1 | +14 | 80.2 | 85.0 | +6 |
| Haze | 67 | 42 | -37 | 58 | 25 | -57 | >34 | <30 | -12* |

*At least 2.2 mm thick part for all compositions

The example compositions (Ex6.1, Ex6.2 and Ex6.3) included a 40 wt % siloxane content PC-siloxane copolymer; the comparative compositions (C6.1, C6.2, C6.3) included a 50 wt % siloxane content PC-siloxane copolymer. Increasing haze with increasing levels of PC-Si copolymer was observed.

From the results, higher transparency in PMMA blends is confined to a narrow compositional range. For example, the PMMA/PC-Si (40% Si) blends have higher transmission and less haze than the PMMA/PC-Si (50% Si) blends. However, PMMA blends with a 50 wt % siloxane PC copolymer are not desirable in film or injection-molded application due to high haze. Higher quality transparent PMMA blends are achievable with PC-siloxane copolymers having a highly constrained (25-45 wt %) siloxane content.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

The invention claimed is:

1. A thermoplastic composition comprising:
   from about 30 wt % to about 95 wt % poly(methyl methacrylate) (PMMA); and
   from about 5 wt % to about 70 wt % of a poly(carbonate-siloxane) copolymer having a siloxane content of from about 25 wt % to about 45 wt %,
   wherein the composition is hydrothermally stable, or
   wherein the composition has a storage modulus of at least about 600 MPa at 25° C. as tested in accordance with ASTM D638.

2. The thermoplastic composition according to claim 1, wherein the poly(carbonate-siloxane) copolymer has a siloxane content of about 40 wt %.

3. The thermoplastic composition according to claim 1, wherein the composition is transparent.

4. The thermoplastic composition according to claim 1, wherein the composition is flexible.

5. The thermoplastic composition according to claim 1, wherein the composition further comprises one or more additional additives.

6. The thermoplastic composition according to claim 5, wherein the one or more additional additives is selected from the group consisting of: a filler; a pigment; a whitening agent; an optical brightener; a surfactant; a processing aid; a thermal stabilizer; a photochemical stabilizer; and combinations thereof.

7. The thermoplastic composition according to claim 1, wherein the composition has a notched Izod impact strength as measured in accordance with ASTM D256 at 23° C. that is higher than that of a substantially identical reference composition that does not include the poly(carbonate-siloxane) copolymer.

8. The thermoplastic composition according to claim 1, wherein the composition has a flexural modulus as measured in accordance with ASTM D790 at 23° C. that is lower than that of a substantially identical reference composition that does not include the poly(carbonate-siloxane) copolymer.

9. The thermoplastic composition according to claim 1, wherein the composition has a nano-dispersed poly(carbonate-siloxane) copolymer phase in the PMMA and a single glass transition temperature (Tg).

10. A method of making a thermoplastic composition, comprising:
    (a) combining from about 30 wt % to about 95 wt % poly(methyl methacrylate) (PMMA) and from about 5 wt % to about 70 wt % of a poly(carbonate-siloxane) copolymer having a siloxane content of from about 25 wt % to about 45 wt % to form a mixture; and
    (b) melt processing the mixture to polymerize it and form the thermoplastic composition.

11. The method according to claim 10, wherein step (b) is performed at a temperature of less than about 240° C.

12. An article comprising the thermoplastic composition according to claim 1, wherein the article is a film for a consumer electronics device.

* * * * *